Aug. 5, 1952  R. E. GOODENOUGH  2,605,644
MANUALLY ADJUSTABLE REVERSE MOTION CONTROL
Filed June 15, 1951  2 SHEETS—SHEET 1
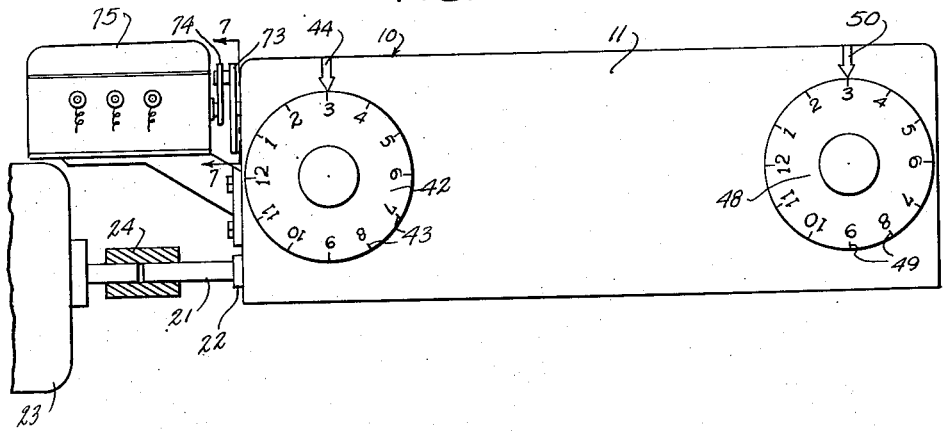
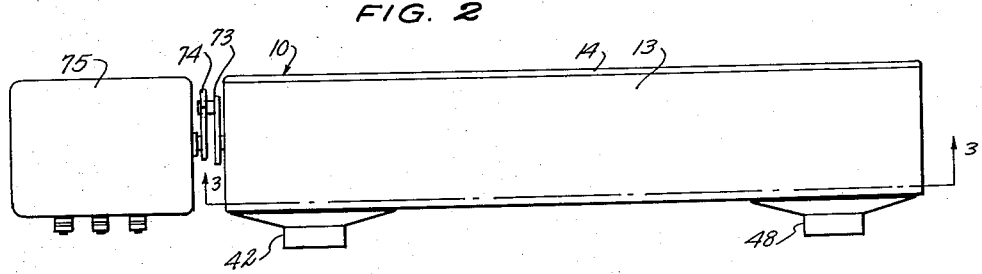
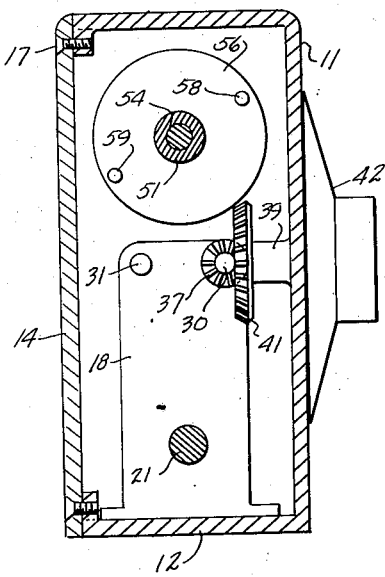
INVENTOR
RUSSELL E. GOODENOUGH,
BY
McMorrow, Berman & Davidson
ATTORNEYS Aug. 5, 1952     R. E. GOODENOUGH     2,605,644
MANUALLY ADJUSTABLE REVERSE MOTION CONTROL
Filed June 15, 1951     2 SHEETS—SHEET 2
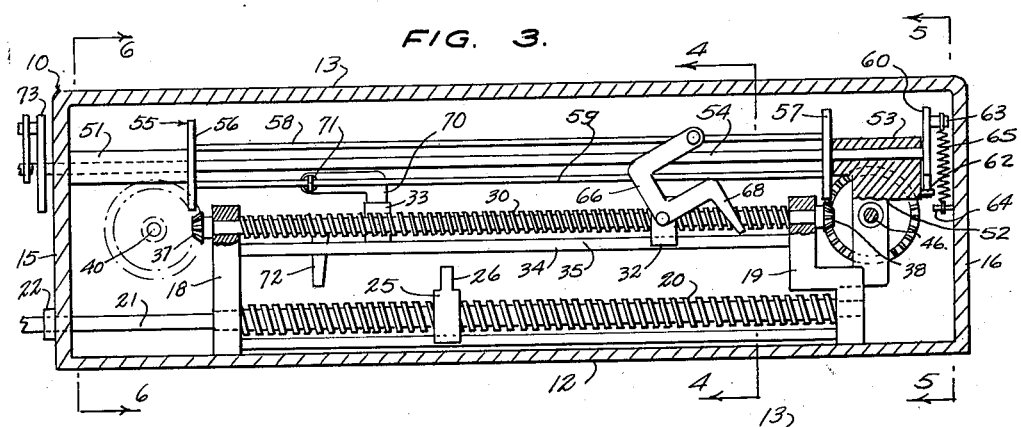
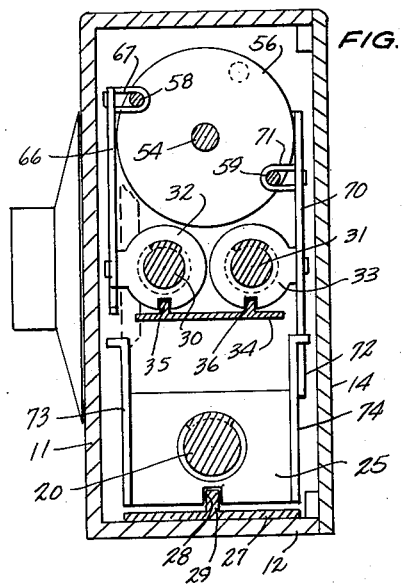
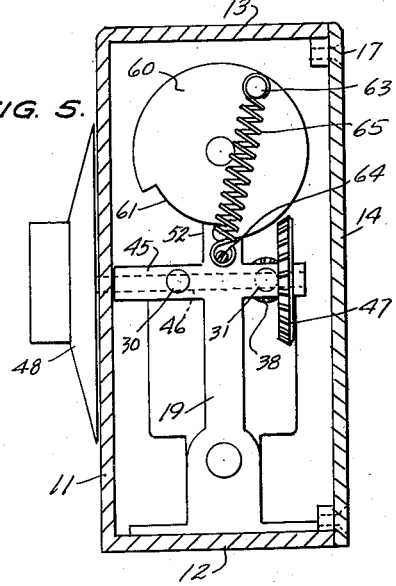
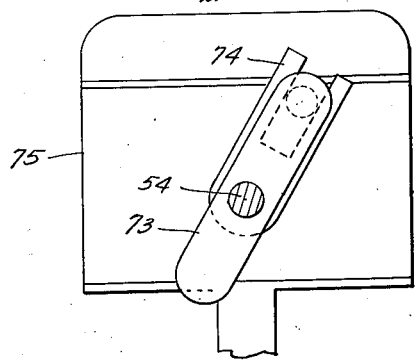
INVENTOR
RUSSELL E. GOODENOUGH,
BY
McMorrow, Berman & Davidson
ATTORNEYS Patented Aug. 5, 1952

2,605,644

UNITED STATES PATENT OFFICE 2,605,644

MANUALLY ADJUSTABLE REVERSE MOTION CONTROL

Russell E. Goodenough, Northfield, Vt.

Application June 15, 1951, Serial No. 231,737

9 Claims. (Cl. 74—59)

This invention relates to manually adjustable reverse motion limit controls and more particularly to a reverse motion limit control which can be manually adjusted to predetermine the limits of motion in both directions.

It is among the objects of the invention to provide an improved reverse motion limit control which can be manually adjusted to predetermine the limits of a reversing motion in both directions and will operate automatically to maintain the motion limits for which it is set; which will actuate an electric switch or equivalent device at each selected limit of motion to reverse the motion from such limit; which permits a limited amount of overrun at each limit without damage to the mechanism or disruption of its operation; which is susceptible of fine and accurate adjustments and rapid operation; and which is simple and durable in construction, economical to manufacture and positive and effective in operation.

Other objects and advantages will become apparent from a consideration of the following description and the appended claims in conjunction with the accompanying drawings wherein:

Figure 1 is a front elevational view of a reverse motion limit control illustrative of the invention shown operatively connected to a reversible motor and a motor reversing switch;

Figure 2 is a top plan view of the control and switch illustrated in Figure 1;

Figure 3 is a cross sectional view on an enlarged scale on the line 3—3 of Figure 2;

Figure 4 is a transverse cross sectional view on an enlarged scale on the line 4—4 of Figure 3;

Figure 5 is a transverse cross sectional view on an enlarged scale on the line 5—5 of Figure 3;

Figure 6 is a transverse cross sectional view on an enlarged scale on the line 6—6 of Figure 3; and Figure 7 is a fragmentary cross sectional view on an enlarged scale on the line 7—7 of Figure 1.

With continued reference to the drawings, the reverse motion limit control mechanism of the present invention comprises a hollow housing, generally indicated at 10, of elongated, rectangular shape, providing a support for the movable components of the mechanism. This housing has a flat front wall 11, a bottom wall 12, a top wall 13, a back wall 14, and end walls 15 and 16. The front, bottom, top and end walls are all preferably integrally united to form a housing unit and the back wall 14 is detachably secured to this unit along the rear edges of the bottom, top and end walls by suitable means, such as the screws 17, extending through apertures in the back wall and threaded into tapped holes in lug formations provided on the top and bottom walls.

Bearing blocks 18 and 19 are disposed in the housing 10 and mounted on the bottom wall 12 of the housing, one near each end of the housing and an externally screw threaded shaft 20 is journaled at its ends in these bearing blocks and is disposed adjacent and substantially parallel to the bottom wall 12 of the housing. An extension 21 of the shaft 20 extends from the bearing block 18 through a bearing 22 in the end wall 15 of the housing and the device providing the reversing motion, such as the electric motor 23, is drivingly connected to the shaft extension 21 by suitable means, such as the flexible torque coupling 24, so that the shaft 20 is driven whenever the motor is in operation.

A nut 25 is threaded onto the shaft 20 and has on its side remote from the bottom wall 12 a projection 26 constituting an abutment for a purpose to be later described. A flat plate 27 is mounted on the inner surface of the bottom wall 12 of the housing and carries at the mid-width location of its side remote from the housing bottom wall a rib 28 of rectangular cross sectional shape which is slidably received in a notch 29 in the bottom side of the nut 25 and holds the nut against rotation with the shaft 20, so that the nut will travel longitudinally of this shaft when the shaft is rotated.

Two externally screw threaded shafts 30 and 31 are journaled at their ends in the bearing blocks 18 and 19 and are disposed in spaced apart and substantially parallel relationship to each other and to the shaft 20. These shafts 30 and 31 have their axes in a common plane which is spaced from the side of the shaft 20 remote from the bottom wall 12 of the housing and substantially parallel to the housing bottom wall. A nut 32 is threaded onto the shaft 30 and a similar nut 33 is threaded onto the shaft 31.

A second flat plate 34 is secured at its ends to the bearing blocks 18 and 19 and is disposed immediately below and substantially parallel to the shafts 30 and 31 and this plate has longitudinally extending ribs 35 and 36 thereon disposed below the shafts 30 and 31 respectively, and slidably received in notches provided in the nuts 32 and 33 to maintain these nuts against rotation with the corresponding shafts 30 and 31. With this arrangement, the nuts 32 and 33 will move longitudinally of the corresponding shafts 30 and 31 when these shafts are rotated.

The shaft 30 has a beveled gear 37 on its end adjacent the end wall 15 of the housing, this gear being disposed at the side of the bearing block 18 adjacent the housing end wall 15 and the shaft 31 is provided on its end adjacent the opposite housing end wall 16 with a beveled gear 16 disposed at the side of the bearing block 19 adjacent the housing end wall 16. The front wall 11 of the housing is provided with an inwardly projecting bearing boss 39 adjacent the beveled gear 37 which boss has a bore extending therethrough and to the outer surface of the front wall 11 of the housing. A shaft 40 is journaled in the bearing boss 39 and carries on its inner end a beveled gear 41 larger than the beveled gear 37 and meshing with the latter. A dial knob 42 is secured on the outer end of the shaft 40 and is provided around its periphery with angularly spaced apart indicia 43 which cooperate with an indicating mark 44 on the outer surface of the housing front wall 11 to indicate the rotational position of the dial knob.

When the dial knob is manually rotated the shaft 30 is rotated and the nut 32 is adjustably moved longitudinally of the shaft 30 to selected positions of adjustment along the shaft, the position of the nut being indicated by the registration of the indicia graduations 43 with the indicating mark 44.

A second bearing boss 45, longer than the bearing boss 39, is provided on the front wall 11 of the housing and projects inwardly from the housing front wall at a location adjacent the beveled gear 38 on the screw shaft 31. This boss has a bore extending therethrough to the outer side of the housing front wall 11 and a shaft 46 is journaled in this boss. A beveled gear 47, larger than the gear 38, is mounted on the shaft 46 at the inner end of the bearing boss 45 and meshes with the beveled gear 38. A dial knob 48 is mounted on the shaft 46 at the outer side of the housing front wall 11 and is provided around its periphery with angularly spaced apart indicia graduations 49 which register with an indicating mark 50 on the outer surface of the housing front wall to indicate the rotational position of the dial knob 48 and the corresponding position of the nut 33 longitudinally of the shaft 31.

A bearing boss 51 projects inwardly from the housing end wall 15 in the space between the screw shafts 30 and 31 and the top wall 13 of the housing, and this boss is provided with a bore extending to the outer surface of the corresponding end wall.

The bearing boss 45 for the shaft 46 is formed as a part of the bearing block 19 and an extension 52 of the bearing block 19 projects from the bearing boss 45 toward the top wall 13 of the housing and is provided at its end remote from the housing bottom wall 12 with a bearing boss 53 having a bore therethrough in axial alignment with the bore in the bearing boss 51. A plain shaft 54 is journaled at its ends in the bearing bosses 51 and 53 and extends through the end wall 15 of the housing 10. A frame, generally indicated at 55, is mounted on the shaft 54 between the bearing bosses 51 and 53 and comprises a first disc 56 of circular shape concentrically mounted on the shaft 54 at the inner end of the bearing boss 51, a similar disc 57 of circular shape concentrically mounted on the shaft 54 at the inner end of the bearing boss 53 and rods 58 and 59 secured at their opposite ends to the discs 56 and 57 at locations spaced substantially equal distances from the shaft 54. The rods 58 and 59 are substantially parallel to each other and to the shaft 54 and have their longitudinal center lines substantially in a common plane which also includes the longitudinal center line of the shaft 54.

A third disc 60, also of circular shape, is concentrically mounted on the shaft 54 at the end of the bearing boss 53 adjacent the end wall 16 of the housing and this disc is provided in the periphery thereof with a circumferentially extending notch 61. A pin 62 is mounted in the bearing boss 53 at the end of the latter adjacent the housing end wall 16 and extends into the notch 61 in the disc 60 to provide a limit stop for rocking or rotational movements of the frame 55. A pin 63 projects from the disc at a location diametrically opposite the center of the notch 61 and a complementary pin 64 projects inwardly from the end wall 16 of the housing at a location at the side of the pin 62 adjacent the bottom wall 12 of the housing. A tension spring 65 is connected at one end to the pin 63 and at its other end to the pin 64 and resiliently urges the frame to limiting positions at which the pin 62 is in engagement with one end or the other of the notch 61, the spring passing over a dead center position as the disc 60 turns within the rotational movement limited by the length of the notch.

A trip lever 66 of U shape having substantially right angular corners is pivotally connected at one corner to the nut 32 and extends from this nut toward the top wall 13 of the housing. One leg of this trip lever extends along the rod 58 of the frame and this leg is connected at its distal end to the frame rod 58 by a staple 67 which is secured to the trip lever and extends around the frame rod. The other leg of the trip lever extends along the shaft 30 and is provided at its distal end with a projection 68 which extends toward the bottom wall 12 of the housing and is engaged by the projection 26 on the nut 25 when the nut 25 is moved along the screw shaft 20 to the location of the trip lever projection 68.

A second trip lever 70, similar in size and shape to the trip lever 66, is pivotally connected at one of its right angle corners to the nut 33 on the screw shaft 31 and has one leg extending along the rod 59 of the frame and its other leg extending along the screw shaft 31. The trip lever 70 is connected at one end to the frame rod 59 by a staple 71 similar to the staple 67 on the trip lever 66 and is provided at its other end with an extension 72 projecting toward the bottom wall 12 of the housing and engaged by the extension 26 on the nut 25 when the nut 25 is moved to the location of the trip lever extension 72.

As is particularly illustrated in Figure 4, the nut 25 may be of rectangular shape and the extension 26 thereon may take the form of two bars 73 and 74 secured one to each end of the nut, the bar 73 being disposed adjacent the front wall 11 and the bar 74 adjacent the rear wall 14 of the housing. These bars extend beyond the nut toward the screw shafts 30 and 31 and have at their ends adjacent these screw shafts outwardly turned portions engageable with the trip lever extensions 68 and 72 respectively.

The trip levers 66 and 70 are mounted in opposition to each other, so that each trip lever will be operated when the nut 25 moves against it from a position between the two trip levers. When the trip lever 66 is operated, it moves the frame bar 58 upwardly toward the top wall 13 of the housing rotating the frame in the corresponding direction. After the frame has been rotated or rocked sufficiently to bring the upper end of the spring 65 over the dead center location of the pin 63, the spring then continues the rocking movement of the frame in the same direction until the corresponding end of the notch 61 is brought into engagement with the pin 62. This action of the spring 65 will lift the extension 68 of the trip lever to a position at which the extension on the nut 25 can pass under the trip lever extension to compensate for overrun of the mechanism. Rocking of the frame 55 will, however, reverse the motion and the nut 25 will be carried back under the trip lever extension 68 to a location between the trip levers and will subsequently engage the extension 72 of the trip lever 70 to rock the frame in the opposite direction. When the extension 72 of the trip lever 70 is engaged by the nut extension 26, it will force the frame bar 59 toward the top wall 13 of the housing, rocking the frame in the opposite direction and the spring 65, after passing over its dead center position, will turn the frame until the other end of the notch 61 is brought into engagement with the pin 62, whereupon the nut 25 may pass under the trip lever extension 72 to compensate for overrun of the mechanism in the manner indicated above.

A switch operating element, such as the crank 73, is secured on the end of the shaft 54 at the outer side of the end wall 15 of the housing and this crank is connected to the throw lever 74 of a reversing switch 75 connected into the wiring system of the motor 23. As the switch 75 and the motor and switch wiring system may be of a form well known to the art, it has not been considered necessary to illustrate and describe the switch and wiring system in detail.

As the frame 55 is rocked by the trip levers 66 and 70, the throw arm 74 of the switch will be successively moved from one to the other of its operating positions, causing the motor 23 to periodically reverse its direction of rotation. By adjusting the nuts 32 and 33 along the corresponding screw shafts 30 and 31 by means of the dial knobs 42 and 48, the number of rotations of the motor 23 in each direction can be accurately predetermined.

If the apparatus is not subject to overrun when reversed, the notch 61 can be shortened or the disc 60 and spring 65 entirely omitted and the nut 25 will then not pass the extensions 68 and 72 of the trip levers. It is also to be understood that the switch actuating element 73 may be varied to operate different types of reversing switches without in any way exceeding the scope of the invention.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A manually adjustable reverse motion limit control comprising a support, a first screw threaded shaft journaled at its ends on said support and adapted to be connected at one end to a rotatable element subject to reversal of its rotation, a nut on said first shaft movable longitudinally of the latter upon rotation of the shaft, a second screw threaded shaft journaled at its ends on said support in spaced and substantially parallel relationship to said first shaft, a nut on said second shaft, a third screw threaded shaft journaled at its ends on said support in spaced and substantially parallel relationship to said second shaft, a nut on said third shaft, a frame journaled at its ends on said support and including spaced apart and substantially parallel bars disposed in spaced and substantially parallel relationship to said second and third shafts, a switch actuating element on one end of said frame, a first trip lever pivotally mounted intermediate its length on the nut on said second shaft and engaging at one end one of the bars of said frame, a second trip lever pivotally mounted on the nut on said third shaft and engaging at one end the other bar of said frame, the nut on said first shaft engaging the other ends of said trip levers at the corresponding reverse motion limits to actuate said trip levers to rock said frame and move said switch actuating element, and manually rotatable means mounted on said support and drivingly connected with said second and third shafts for independently rotating the latter to move the corresponding nuts longitudinally thereof and thereby predetermine the reverse motion limits of the control.

2. A manually adjustable reverse motion limit control comprising a support, a first screw threaded shaft journaled at its ends on said support and adapted to be connected at one end to a rotatable element subject to reversal of its rotation, a nut on said first shaft movable longitudinally of the latter upon rotation of the shaft, a second screw threaded shaft journaled at its ends on said support in spaced and substantially parallel relationship to said first shaft, a nut on said second shaft, a third screw threaded shaft journaled at its ends on said support in spaced and substantially parallel relationship to said second shaft, a nut on said third shaft, a frame journaled at its ends on said support and including spaced apart and substantially parallel bars disposed in spaced and substantially parallel relationship to said second and third shafts, a switch actuating element on one end of said frame, a first trip lever pivotally mounted intermediate its length on the nut on said second shaft and engaging at one end one of the bars of said frame, a second trip lever pivotally mounted on the nut on said third shaft and engaging at one end the other bar of said frame, the nut on said first shaft engaging the other ends of said trip levers at the corresponding reverse motion limits to actuate said trip levers to rock said frame and move said switch actuating element, manually rotatable means mounted on said support and drivingly connected with said second and third shafts for independently rotating the latter to move the corresponding nuts longitudinally thereof and thereby predetermine the reverse motion limits of the control, stop means acting between said frame and said support limiting rocking movements of said frame to positions at which the nut on said first screw shaft will pass said trip levers to compensate said control for overrun of the reversing movement imparted thereto, and spring means connected between said frame and said support to move said frame to the limits of rocking movement determined by said stop means after rocking movement of said frame has been initiated by said trip levers.

3. A manually adjustable reverse motion limit control comprising a support, a first screw threaded shaft journaled at its ends on said support and adapted to be connected at one end to a rotatable element subject to reversal of its rotation, a nut on said first shaft movable longitudinally of the latter upon rotation of the shaft, a second screw threaded shaft journaled at its ends on said support in spaced and substantially parallel relationship to said first shaft, a nut on said second shaft, a third screw threaded shaft journaled at its ends on said support in spaced and substantially parallel relationship to said second shaft, a nut on said third shaft, a frame journaled at its ends on said support and including spaced apart and substantially parallel bars disposed in spaced and substantially parallel relationship to said second and third shafts, a switch actuating element on one end of said frame, a first trip lever pivotally mounted intermediate its length on the nut on said second shaft and engaging at one end one of the bars of said frame, a second trip lever pivotally mounted on the nut on said third shaft and engaging at one end the other bar of said frame, the nut on said first shaft engaging the other ends of said trip levers at the corresponding reverse motion limits to actuate said trip levers to rock said frame and move said switch actuating element, and manually rotatable means mounted on said support and drivingly connected with said second and third shafts for independently rotating the latter to move the corresponding nuts longitudinally thereof and thereby predetermine the reverse motion limits of the control, said manually rotatable means including adjusting shafts journaled on said support and drivingly connected one with each of said second and third screw threaded shafts, and dial knobs mounted one on each of said adjusting shafts.

4. A manually adjustable reverse motion limit control comprising a support, a first screw threaded shaft journaled at its ends on said support and adapted to be connected at one end to a rotatable element subject to reversal of its rotation, a nut on said first shaft movable longitudinally of the latter upon rotation of the shaft, a second screw threaded shaft journaled at its ends on said support in spaced and substantially parallel relationship to said first shaft, a nut on said second shaft, a third screw threaded shaft journaled at its ends on said support in spaced and substantially parallel relationship to said second shaft, a nut on said third shaft, a frame journaled at its ends on said support and including spaced apart and substantially parallel bars disposed in spaced and substantially parallel relationship to said second and third shafts, a switch actuating element on one end of said frame, a first trip lever pivotally mounted intermediate its length on the nut on said second shaft and engaging at one end one of the bars of said frame, a second trip lever pivotally mounted on the nut on said third shaft and engaging at one end the other bar of said frame, the nut on said first shaft engaging the other ends of said trip levers at the corresponding reverse motion limits to actuate said trip levers to rock said frame and move said switch actuating element, and manually rotatable means mounted on said support and drivingly connected with said second and third shafts for independently rotating the latter to move the corresponding nuts longitudinally thereof and thereby predetermine the reverse motion limits of the control, said support comprising a hollow housing of elongated rectangular shape and bearing blocks mounted in said housing one near each end thereof.

5. A manually adjustable reverse motion limit control comprising a support, a screw shaft journaled on said support and adapted to be driven by a reversible driving element, a nut threaded on said screw shaft and movable longitudinally of the screw shaft upon rotation of the latter, a structure movably mounted on said support and adapted to be connected to a motion reversing device, lever carrying members disposed adjacent said screw shaft at locations spaced apart longitudinally of the latter, levers pivotally mounted intermediate their length one on each of said lever carrying members and each having one end connected to said structure for imparting movement to the latter for operating a motion reversing device connected thereto, the other ends of said levers being engaged by said nut for alternately moving said levers, and manually operated means connected between said lever carrying members and said support for supporting said members and said levers from said support and adjustably moving said levers longitudinally of said screw shaft to adjustably vary the limits of reverse motion predetermined by said control.

6. A manually adjustable reverse motion limit control comprising a support, a screw shaft journaled on said support and adapted to be driven by a reversible driving element, a nut threaded on said screw shaft and movable longitudinally of the screw shaft upon rotation of the latter, a structure movably mounted on said support and adapted to be connected to a motion reversing device, levers disposed adjacent said screw shaft at locations spaced apart longitudinally of the latter and each having one end connected to said structure for imparting movement to the latter for operating a motion reversing device connected thereto, the other ends of said levers being engaged by said nut for alternately moving said levers, and manually operated means connected between said levers and said support for adjustably moving said levers longitudinally of said screw shaft to adjustably vary the limits of reverse motion predetermined by said control, said manually operated means comprising manually rotatable screw shafts journaled on said support in spaced and substantially parallel relationship to the first mentioned screw shaft, and nuts threaded one on each of said manually rotatable screw shafts and pivotally connected one to each of said levers intermediate the lengths of the corresponding levers.

7. A manually adjustable reverse motion limit control comprising a support, a screw shaft journaled on said support and adapted to be driven by a reversible driving element, a nut threaded on said screw shaft and movable longitudinally of the screw shaft upon rotation of the latter, a structure movably mounted on said support and adapted to be connected to a motion reversing device, a lever disposed adjacent said screw shaft and connected at one end to said structure for imparting movement to the latter for operating a motion reversing device connected thereto, the other end of said lever being engaged by said nut, and manually operated means connected between said lever and said support for moving said lever longitudinally of said screw shaft to adjustably vary the limits of reverse motion predetermined by said control, said manually operated means comprising at least one manually rotatable screw shaft journaled on said frame in spaced and substantially parallel relationship to the first mentioned screw shaft, and a nut threaded on said manually rotatable screw shaft and pivotally connected to said lever.

8. In combination with a reversible electric motor and a reversing switch therefor, manually adjustable reverse motion limit control means comprising a support, a screw shaft journaled on said support and drivenly connected to said motor, a nut threaded onto said screw shaft and movable longitudinally of the shaft upon rotation of the latter, a switch operating structure movably mounted on said support and connected to said reversing switch, a lever connected at one end to said switch operating structure and engaged at its other end by said nut at predetermined positions of said nut longitudinally of said screw shaft, and manually operated means movably mounted on said support and pivotally connected to said lever intermediate the length of the latter for supporting said lever and moving it longitudinally of said screw shaft to vary the position longitudinally of said screw shaft at which said nut engages said lever.

9. In combination with a reversible electric motor and a reversing switch therefor, manually adjustable reverse motion limiting control means comprising a support, a screw shaft journaled on said support and drivenly connected to said motor, a nut threaded onto said screw shaft and movable longitudinally of the shaft upon rotation of the latter, a switch operating structure movably mounted on said support and connected to said reversing switch, levers disposed adjacent said screw shaft at locations spaced apart longitudinally of the latter and connected each at one end to said switch operating structure and engaged each at its other end by said nut at predetermined positions of said nut longitudinally of said screw shaft, said levers being alternately moved by said nut to impart respectively opposite movements to said switch operating structure, and manually operated means movably mounted on said support and pivotally connected to said levers intermediate the length thereof for supporting said levers on said support and moving them longitudinally of said screw shaft to vary the positions longitudinally of said screw shaft at which said nut engages said levers.

RUSSELL E. GOODENOUGH.

REFERENCES CITED

The following references are of record in the file of this patent:

UNITED STATES PATENTS

| Number | Name | Date |
|---|---|---|
| 1,587,554 | Rodrick | June 8, 1926 |
| 2,247,562 | Santen | July 1, 1941 |
| 2,259,291 | Chapman | Oct. 14, 1941 |
| 2,471,596 | Williams | May 31, 1949 |